United States Patent [19]

Tateno

[11] Patent Number: 5,613,431
[45] Date of Patent: Mar. 25, 1997

[54] AVOCADO CUTTER

[76] Inventor: Chikara R. Tateno, 1815 Katrina Ct., Santa Cruz, Calif. 95062

[21] Appl. No.: 645,449

[22] Filed: May 13, 1996

[51] Int. Cl.$^6$ .............................. A23N 3/00; A47J 17/00; A47J 25/00
[52] U.S. Cl. .................... 99/541; 30/114; 30/117; 30/123.5; 30/302; 83/437.1; 83/857; 99/540; 99/545; D7/673
[58] Field of Search ........................... 99/537–545, 584, 99/588; 30/113.1–113.3, 114, 117, 123.5–123.7, 128, 130, 300–304; 83/857, 437, 856, 858; D7/673

[56] References Cited

U.S. PATENT DOCUMENTS

| | | | |
|---|---|---|---|
| 1,466,114 | 8/1923 | Buchi | 30/302 |
| 1,607,009 | 11/1926 | Match | 30/114 |
| 2,403,190 | 7/1946 | Parraga | 30/117 X |
| 2,509,190 | 5/1950 | Langley | 99/545 |
| 3,540,503 | 11/1970 | McNair | 99/544 X |
| 4,007,676 | 2/1977 | Ellis | 99/545 |
| 4,111,112 | 9/1978 | Altman | 99/545 X |
| 4,246,700 | 1/1981 | Coulon et al. | 99/544 X |
| 4,383,367 | 5/1983 | Mielnicki | 99/538 X |
| 5,101,718 | 4/1992 | Lin | 99/537 X |
| 5,108,771 | 4/1992 | Bannister | 99/584 X |
| 5,146,681 | 9/1992 | Haghkar | 99/589 X |
| 5,533,442 | 7/1996 | Tateno | 99/541 |

*Primary Examiner*—Timothy F. Simone
*Attorney, Agent, or Firm*—Jeffrey A. Hall

[57] ABSTRACT

A tool for use on an avocado, for separating the meat of an avocado from its skin while simultaneously cutting the meat into separate slices, comprising a handle having a first end and a second end and a frame mounted at one end of the handle. The frame has a cutter fastener portion and a handle fastening portion operably secured to the handle and extending away therefrom. A plurality of cutting elements are operably positioned on the frame. An elongated adjustment element extends through the handle and into the frame. A first end of the elongated adjustment element is secured to the plurality of cutting elements and a second end is secured to a rotatable adjustment knob. Fastening elements are slidably secured to the cutter fastener portion of the frame and to the handle fastening portion of the frame allowing the cutter fastening portion of the frame and the handle fastening portion of the frame to be adjusted in relationship to each other.

12 Claims, 1 Drawing Sheet

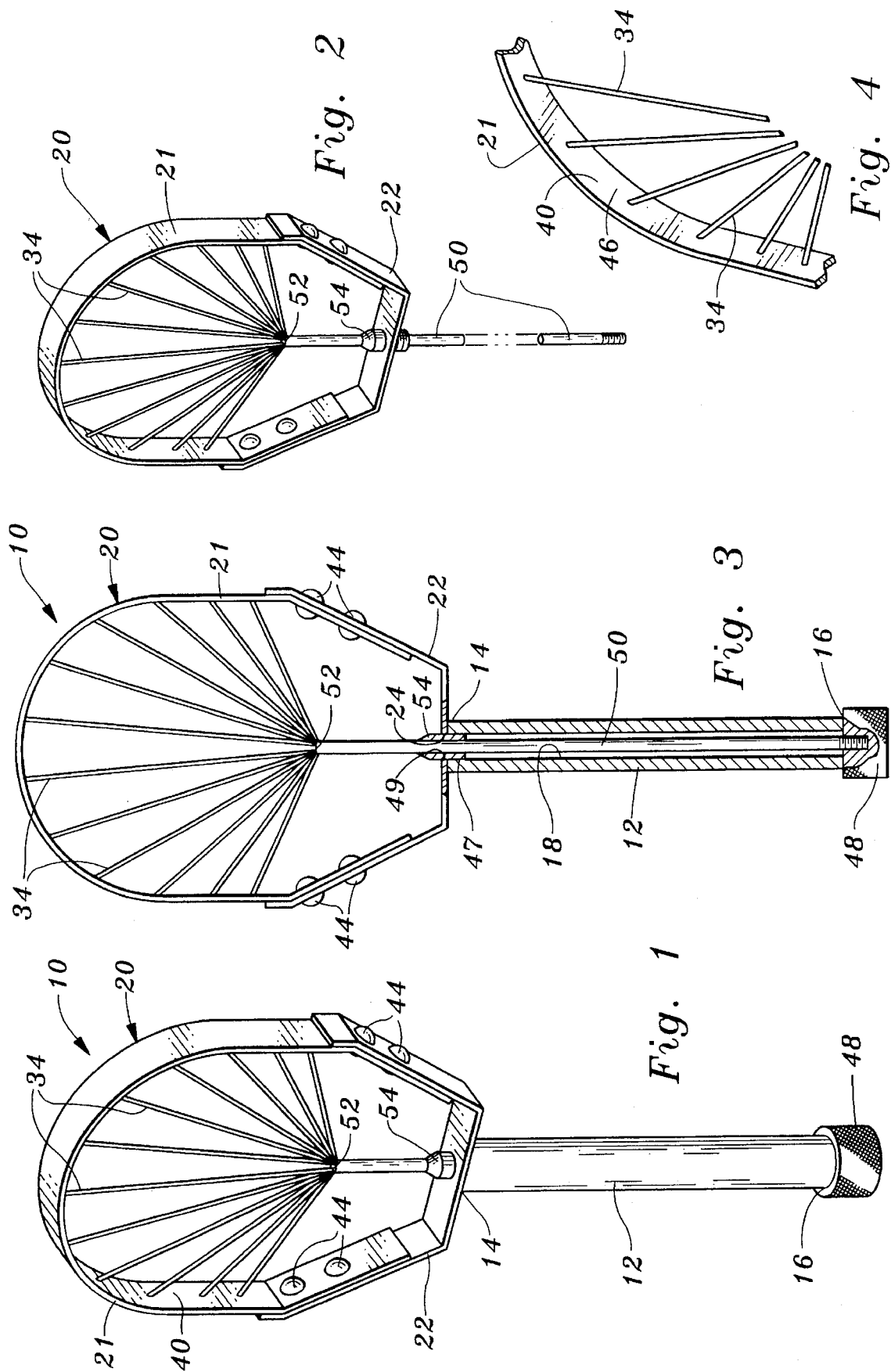

AVOCADO CUTTER

BACKGROUND OF THE INVENTION

1. Field of Invention

This invention relates to cutlery, and more particularly to cutlery for peeling the skin of an avocado from its meat and simultaneously slicing the meat into sections.

2. Description of the Related Art

Various cutting and peeling and apparatus have been proposed and implemented to cut and peel fruits and vegetables. In recent years there has been a tremendous surge in the consumption of avocados both in restaurants and in homes. This surge in consumption is part in due to the surge in consumption of all fruits and vegetables, and part in due to the inherent qualities of the avocado.

A related patent application filed by the present inventor, U.S. patent application Ser. No. 08/561,106, now U.S. Pat. No. 5,533,442, provides an avocado peeler and slicer which differs from the present invention in that an adjustable wire cutting means secured within the handle of the cutter is disclosed herein as well as a different frame adjustment means.

The currently known method of preparing avocados has been labor intensive and messy, resulting in greater expense and inconvenience to the ultimate consumer. When large number of avocados must be skinned, de-pitted, and sliced whether in a restaurant or at home, significant expenditures of time and labor must be expended, both in the skinning, de-pitting, and slicing operation. Moreover, currently known methods for preparing avocado typically result in significant mess from discarded peels, pit, and residual meat. Due to such demand and such limitations with all known methods of preparing avocados, there is a significant demand for a tool which would enable avocados to be skinned, de-pitted, and sliced simultaneously in a rapid clean, safe, and reliable manner.

Accordingly, it is the primary object of this invention to provide an avocado cutter which allows for the rapid, convenient, safe, and clean, peeling and slicing of avocados, and which is inexpensive to clean, use, and manufacture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, a tool for use on an avocado is provided, for separating the meat off an avocado from its skin while simultaneously cutting the meat into separate slices, comprises a handle having a first end and a second end, and cutting means mounted at one end of the handle. The cutting means include a frame element operably secured to the handle and extending away therefrom. The frame element includes a cutter fastener portion and a handle fastening portion. The cutter fastening portions includes a plurality of apertures operably positioned therein, and the handle fastening portion has a receiving aperture operably positioned therein for receiving and securing the handle. A plurality of cutting elements, which are preferably composed of wire are operably positioned on the cutter fastener portion of the cutting means. Adjustment means for adjusting the plurality of cutting elements are provided and fastening element means slidably are secured to the cutter fastener portion of the cutting means and to the handle fastening portion of the cutting means allowing for adjustments of the cutter fastening portion and the handle fastening portion in relation to each other and to the second end of the handle.

The avocado cutting tool may be provided in a variety of sizes to accommodate different sizes of avocados. The frame and cutting wire or blades are preferably composed of metal, and the handle composed of plastic, rubber, composite, or other durable, resilient material. Preferably the cutting elements are positioned in a uniform fashion, however they may also be positioned in a staggered relationship to one another on the inner surface of the frame and are preferably provided in different lengths.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is a front perspective view of an avocado cutter, according to the invention.

FIG. 2 is a front perspective of an avocado cutter showing the frame detached from the handle, according to the invention.

FIG. 3 is a front view of an avocado cutter, according to the invention.

FIG. 4 is a view of the inner wall of the frame of such avocado cutter, according to the invention.

DESCRIPTION OF THE PREFERRED EMBODIMENTS

Reference will now be made in detail to the present preferred embodiments of the invention as illustrated in the accompanying drawings.

In accordance with the present invention, there is provided in a preferred embodiment of the invention a tool for use on an avocado, for separating the meat of the avocado from its skin while simultaneously cutting the meat into separate slices, comprising a handle having a first end and a second end. Cutting means are operably mounted at one end of the handle, the cutting means include a frame with a plurality of cutting elements, preferably composed of wire mounted at one end of the handle. The frame is operably secured to the handle and extends away therefrom. The frame element includes a cutter fastener portion and a handle fastening portion. The cutter fastening portion includes a plurality of apertures operably positioned therein, and the handle fastening portion has a receiving aperture operably positioned therein for receiving and securing the handle. A plurality of cutting elements are operably positioned on the cutter fastener portion of the cutting means. Adjustment means for adjusting for adjusting the plurality of cutting elements preferably includes an elongated element operably secured in the handle and extending therefrom. The elongated element is preferably secured at a first end to the plurality of cutting elements and at a second end to a rotatable adjustment knob. Fastening element means are slidably secured to the cutter fastener portion of the cutting means and to the handle fastening portion of the cutting means allowing for adjustments of the cutter fastening portion and the handle fastening portion in relation to each other and to the second end of the handle.

In FIG. 1, the avocado cutting tool 10 is shown according to a preferred embodiment of the invention. Tool 10 has handle 12 with a first end 14, an interior bore 18, and a second end portion 16 which has adjustment knob 48, operably secured thereto. Cutting means preferably include frame 20 with cutting elements 34 which are mounted at one end of handle 12, preferably at second end 14 and may be fastened thereto with threaded portion 47 of handle 12 being screwed into threaded portion 49 of handle mount 54. Frame 20 preferably includes a cutters fastener portion 21 and a handle fastening portion 22 which may be secured together by fastening elements 44 and are operably secured to handle 12 and extend away therefrom. Cutter fastening portion 21 preferably includes a plurality of spaced apertures 24 for securing and receiving cutting elements 34, which are preferably metal wire, but may, in alternative embodiments be blades of varying sizes shapes and dimensions.

Although cutter fastening portion 21 of frame 20 and handle fastening portion 22 of frame 20 have been described as two separate portions, tool 10 may be configured with a unitary frame. In this configuration, cutter fastening portion 21 still secures cutting elements 34 and handle fastening portion 22 secure handle 12, and functions in exactly the same way, however in this embodiment cutter fastening portion 21 and handle fastening portion 22 are integral with one another forming frame 20. Frame 20, with cutter fastening portion 21 and handle fastening portion 22 are preferably composed of a metal, such as stainless steel, however, other durable, resilient materials may be used such as plastic.

As seen in FIGS. 1, 2, 4 and 5, a plurality of cutting elements 34 are operably positioned in apertures 24 in cutter fastening portion 21 of frame 20. Preferably either 12 wire blades or 11 such wire blades are used, however a fewer or greater number of blades, such as 4, 5, 14, 15, etc. may be used. Cutter fastening portion 21 and handle fastening portion 22 of frame 20 may be fastened as shown to one another to accommodate peeling and slicing different sizes of avocado. Tool 10 may be provided, in different embodiments, with cutting elements 34 being all of one size, for example all short blades, or all long blades, or provided, with a mix of short and long cutting wires or blades. Cutting elements 34 are preferably composed of a metal, such as stainless steel, copper, alloys, or other durable, resilient material.

Fastening element means, which may be clips 44, clamps, rings or other fastening elements, are slidably secured to cutter fastening portion 21 and handle fastening portion 22 of frame 20 allowing for adjustments in relation to each other and thereby changing the size and/or shape of the cutting area of tool 10. By moving cutter fastening portion 21 in relation to handle fastening portion 22 a smaller or larger inner cutting area is provided. Alternatively, an integral frame may be used instead of two separate components, in such case, clips 44 are not used.

Frame 20, as seen in FIGS. 1 and 4 is preferably configured with a broadened curved shaped portion 46, for efficient cutting and scooping of the avocado meat from the skin. Broadened portion 46 is preferably shaped to scoop and remove the avocado from its skin and may be provided with a sharpened edge or otherwise. It is also seen in FIGS. 1–4 that cutting elements 34 are preferably positioned in a spaced relationship to one another on inner wall 40 of frame 20. Alternatively, cutting elements 34 may be aligned and positioned in different ways, for example in a linear, staggered, or axially disposed arrangement, or any other spaced relation depending upon the size of the slice of avocado that is desired.

In reference now to FIG. 1, tool 10 is shown in a preferred embodiment with cutter fastener portion 21 and handle fastener portion 22 fastened and positioned together by means of fastener 44, and handle end 14 inserted through aperture 49, which is preferably threaded. In FIGS. 2 and 3 cutter fastener portion 21 and handle fastener portion 22 are shown held together and cutting elements 34 are disposed in a slicing configuration. Tool 10 as shown, may be easily and conveniently used cutting from either a right hand side or a left hand side of the avocado.

In FIG. 1, handle 12 is shown having adjustment knob 48 operably secured to handle end 16 an to elongated element 50 rotatably secured therein. Elongated element 50 preferably passes through handle 2 in bore 18 into frame 20 and cutting elements are secured to a first end thereof. Preferably a handle mount 50 is provided having threaded portion 49 for mating with treaded portion 47 of handle 12. Elongated element 50 is rotated with the turning of adjustment knob 48 this in turn allows for the loosening and/or tightening of cutting elements 34 which are secured to the first end 52 of elongated element 50.

Referring now to FIG. 3, frame 20 is shown detached from handle 12. It is a convenient feature to provide tool 10 with removable frame 20. This feature allows for cleaning, repair, or replacement of frame 20 with different frames or parts. Of course frame 20 may be provided fixed to handle 12 if desired.

In FIG. 4, the inner wall 40 of cutter fastening portion 21 of frame 20 is shown. Cutting elements 34 may be secured to cutter fastening portion 21 by securing and positioning them in apertures 24 and using a twist or knot if wire is used, or alternatively, other fastening means such as clips, clamps, screws, rings or the like may be used.

In operation and use tool 10 is very convenient, easy, reliable, and effective at cutting, scooping, peeling, and de-pitting an avocado. Tool 10 is held in either the right or left hand and an avocado held in the other hand or placed on a support surface. The avocado is then sliced in half and tool 10 is used to remove the avocado skin, remove the pit, and slice the avocado meat into slices. Tool 10 may be adjusted by changing the position of fasteners 44 and through the use of adjustment knob 48 and elongated element 50. By altering the position of cutter fastening portion 21 and handle fastening portion 22 of frame 20 both the relative and absolute size of frame 20 may be changed. Different sizes and numbers of cutting elements 34 may be provided depending upon the size of avocado to be sliced and the size of slice desired, however, wire composed of metal of other durable resilient material being preferred.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A tool for use on an avocado, for separating the meat of an avocado from its skin while simultaneously cutting the meat into separate slices, comprising:

a handle having a first end and a second end;

cutting means mounted at one end of the handle; the cutting means including a frame element operably secured to the handle and extending away therefrom; the frame element comprising a cutter fastener portion and a handle fastening portion; the cutter fastening portion having a plurality of apertures operably positioned therein, and the handle fastening portion having a receiving aperture operably positioned therein for receiving and securing said handle;

a plurality of cutting elements operably positioned on the cutter fastener portion of the cutting means;

adjustment means for adjusting said plurality of cutting elements; and fastening element means for fastening said cutter fastening portion and said handle fastening portion are slidably secured to the cutter fastener portion of the cutting means and to the handle fastening portion of the cutting means allowing for adjustments of the cutter fastening portion and the handle fastening portion in relation to each other and to the second end of the handle.

2. The tool of claim 1, wherein said adjustment means comprises an elongated element operably secured in said handle and extending therefrom; said elongated element being secured at a first end to said plurality of cutting elements and at a second end to a rotatable adjustment knob.

3. The tool of claim 1, wherein the plurality of cutting elements are spaced at a uniform distance from one another on said cutter fastener portion of said cutting means.

4. The tool of claim 1, wherein the plurality of cutting elements of different length from one another.

5. The tool of claim 1, wherein said plurality of cutting elements are composed of wire.

6. The tool of claim 1, wherein said fastening element comprises a plurality of clip shaped members.

7. A cutting device, for separating the meat of an avocado from its skin while simultaneously cutting the meat into separate slices, comprising:

a handle having a first end and a second end;

a frame operably secured to the handle and extending away therefrom; said frame includes a cutter fastener portion having a plurality of apertures therein and a handle fastening portion having a receiving aperture for receiving and securing said handle therein a plurality of cutting elements secured in said plurality of apertures on said cutter fastener portion of said frame;

adjustment means for adjusting said plurality of cutting elements; and fastening element means for fastening said cutter fastener portion of said frame and said handle fastening portion of said frame together.

8. The avocado cutting device of claim 7, wherein said adjustment means for adjusting said plurality of cutting elements comprises an elongated element operably secured in said handle and extending therefrom; said elongated element being secured at a first end to said plurality of cutting elements and at a second end to a rotatable adjustment knob.

9. The avocado cutting device of claim 7, wherein the plurality of cutting elements are spaced at a uniform distance from one another on said cutter fastener portion of said frame.

10. The avocado cutting device of claim 7, wherein the fastening element means comprise a plurality of clips.

11. The avocado cutting device of claim 7, wherein said plurality of cutting elements are metal blades.

12. The avocado cutting device of claim 7, wherein said plurality of cutting elements are composed of wire.

* * * * *